United States Patent [19]

Foster, Sr.

[11] 4,040,602
[45] Aug. 9, 1977

[54] TENSIONING ANCHOR

[76] Inventor: Howard F. Foster, Sr., 4500 Cavandish Circle, Fort Lauderdale, Fla. 33319

[21] Appl. No.: 672,754

[22] Filed: Apr. 1, 1976

[51] Int. Cl.² ............................................ A63B 61/04
[52] U.S. Cl. ............................... 254/164; 242/129.6; 403/243; 403/365
[58] Field of Search ............ 254/161, 162, 163, 164, 254/165; 24/71.1, 71.2, 269, 68 R, 68 BT; 242/68, 100, 74, 129.6, 129.62, 106, 129.7; 403/365, 243; 85/7, 8.6, 8.9; 151/64

[56] References Cited
U.S. PATENT DOCUMENTS

| 533,099 | 1/1895 | Swan | 151/64 X |
| 1,362,270 | 12/1920 | Socie | 151/64 |
| 1,421,099 | 6/1922 | Reed | 242/129.6 |
| 3,069,110 | 12/1962 | Domer | 242/129.6 |
| 3,533,588 | 10/1970 | Cregier | 254/161 X |
| 3,811,655 | 5/1974 | Foster | 254/161 |
| 3,825,227 | 7/1974 | Whitehill et al. | 254/161 |

Primary Examiner—Robert J. Spar
Assistant Examiner—Donald W. Underwood
Attorney, Agent, or Firm—Oltman and Flynn

[57] ABSTRACT

The invention is an improved anchor for tensioning a flexible element such as a wire, strap or cable. The anchor is normally used to hold down an object such as a trailer. It includes a generally U-shaped frame having legs including circular openings which are axially aligned with each other. A tensioning member is rotatably received in the openings, and a sleeve, which is affixed to the tensioning member, has an aperture for receiving the flexible element such that it can be wound on and unwound from the tensioning member. A locking member is removably affixed to the tensioning member and one leg of the frame to hold the tensioning member against rotation. The locking member has flanges which embrace the frame's leg and edges with a flange which engages the tensioning member to securely lock the tensioning member. The locking member may be inserted and removed without shifting the tensioning member axially.

10 Claims, 8 Drawing Figures

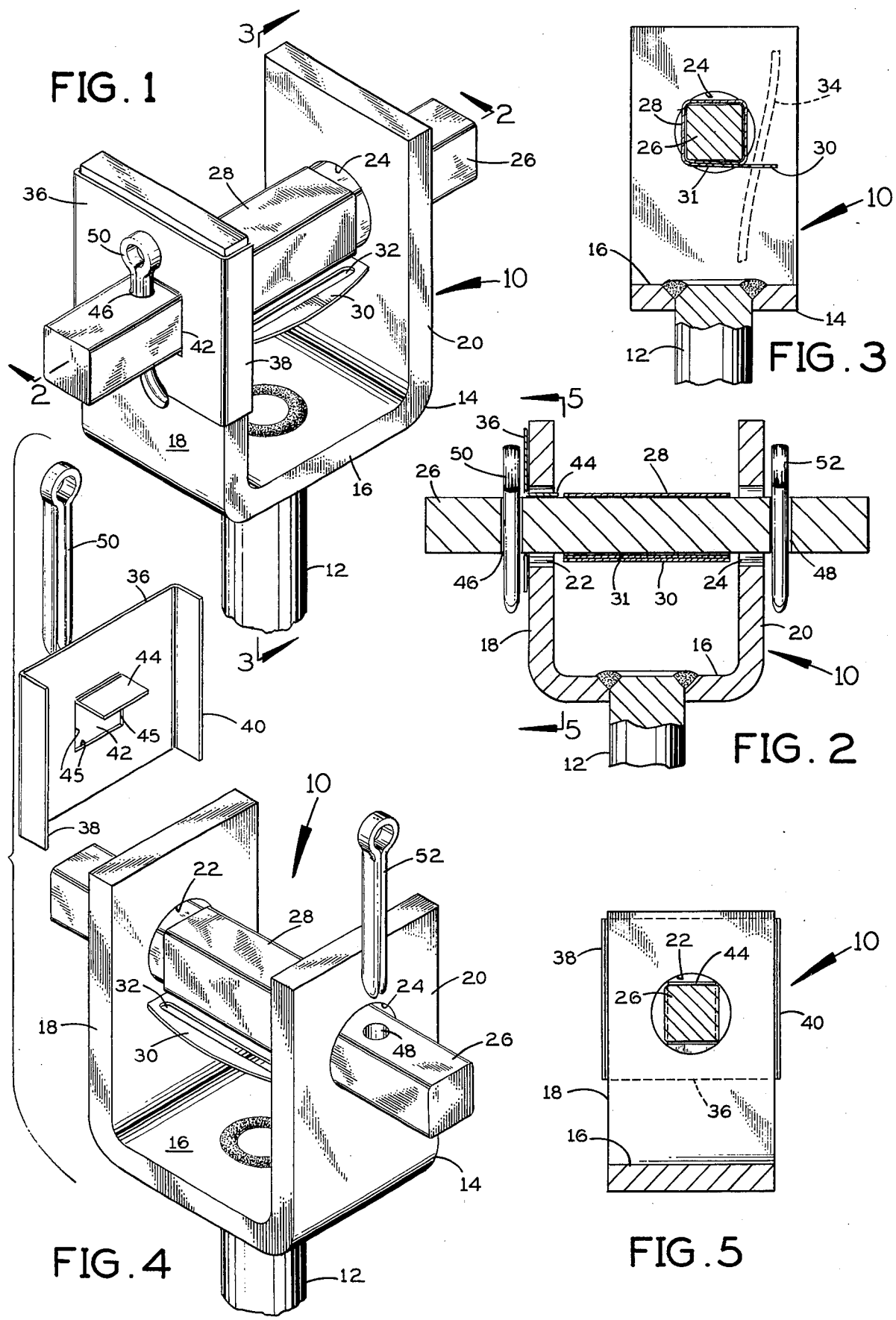

TENSIONING ANCHOR

BACKGROUND OF THE INVENTION

Certain known tensioning anchors of the type which includes a rotatable tensioning member received in openings in legs of a U-shaped frame have included a locking member which can be inserted and removed to lock and unlock the tensioning member without shifting that member axially. Examples of such known devices are described in U.S. Pat. Nos. 3,791,623 and 3,811,655. In the former patent, one leg of the flanges which grasp a locking member, and in certain known devices, such flanges have been provided on the locking member rather than the frame. For example, in the latter patent, the locking member has two flanges, one of which engages the tensioning member and one of which engages a leg of the frame.

It is an object of this invention to retain the advantages of such locking members while improving them by enabling them to lock the tensioning member more securely.

Another object of the invention is to provide a novel attachment for the tensioning member to receive the wire, strap or cable to be wound on the tensioning member.

SUMMARY OF THE INVENTION

The present invention accomplishes the foregoing objects by providing in a tensioning anchor of the type described above:

1. a locking member which has at least two flanges for embracing a leg of the time plus at least one additional flange for engaging the tensioning member, such that the tensioning member is very securely locked; and
2. a sleeve which encircles the tensioning member between the legs of the frame and has an opening for receiving the flexible element to be tensioned.

Further objects and advantages of this invention will be apparent from the following detailed description of a presently-preferred embodiment thereof, which is shown in the accompanying drawings.

BRIEF DESCRIPTION OF THE DRAWINGS

FIG. 1 is a perspective view of a preferred embodiment of the invention showing the tensioning anchor in a locked position;

FIG. 2 is a vertical sectional view taken along lines 2—2 of FIG. 1, and looking in the direction of the arrows;

FIG. 3 is a vertical sectional view taken along line 3—3 of FIG. 1 and looking in the direction of the arrows;

FIG. 4 is another perspective view of the embodiment of FIG. 1 showing several parts of the device in an exploded relation;

FIG. 5 is a vertical sectional view taken along line 5—5 of FIG. 2 and looking in the direction of the arrows;

Figure 6:
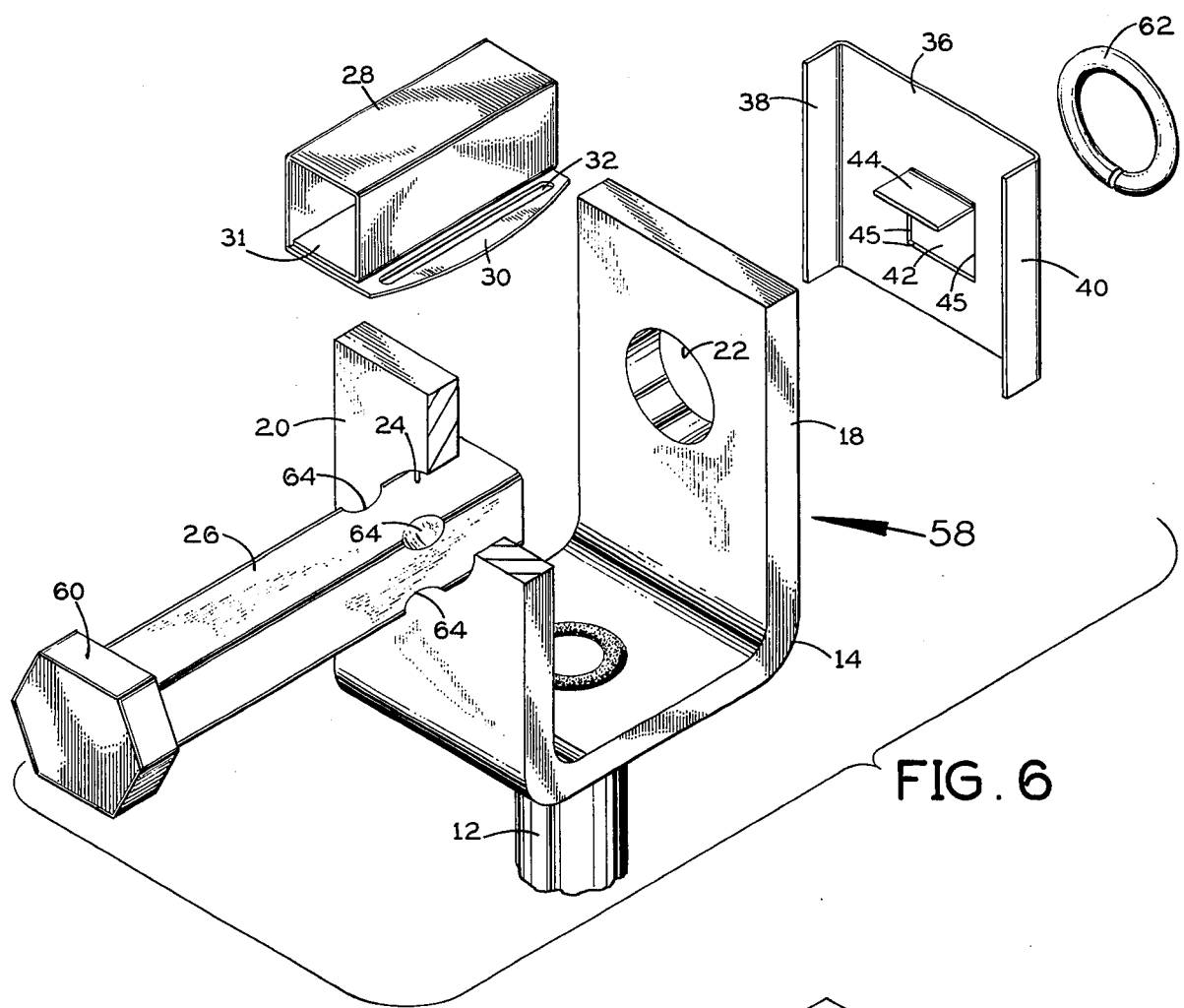
FIG. 6 is a perspective view of another preferred embodiment of the invention showing the parts of the tensioning anchor in an exploded relation.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The tensioning device 10 of FIGS. 1-5 includes a rod 12, the lower end of which is shown broken away because of limited space, but which normally has a screw anchor on it so that the tensioning anchor can be inserted into the ground to hold down an object such as a trailer. The tensioning anchor is intended to receive a wire, strap, cable or the like and tension that flexible element. The flexible element is attached to the trailer or other object to be held down, and when it is tensioned, it securely holds the trailer.

The tensioning anchor 10 includes a generally U-shaped frame 14 which has a base 16 and two upstanding legs 18 and 20 which are spaced apart and extend parallel to each other. In the legs 18 and 20, there are openings 22 and 24 respectively, and these openings are circular.

A squared tensioning member 26 is rotatably received in the openings 22 and 24, and it extends across the space between the legs 18 and 20. It also projects from both of the legs 18 and 20 on the outer sides thereof.

A sleeve 28 encircles the tensioning member 26 and is located between the legs 18 and 20. The sleeve 28 may be put on the tensioning member 26 while the tensioning member is being inserted into the openings 22 and 24. The sleeve 28 has a generally squared configuration so that it is affixed to the squared tensioning member. It may be a strip of metal that wraps around the tensioning member as shown so that its ends 30 and 31 overlap. One of the ends 30 of the sleeve 28 has an aperture 32 for receiving the flexible element 34 to be tensioned in the manner shown in dashed lines in FIG. 3. This flexible element is tensioned by rotating the tensioning member to wind the flexible element 24 on the sleeve 28 and the tensioning member 26.

A locking member 36 is applied to the tensioning member as shown in FIG. 1 so as to lock the tensioning member in place after the flexible element 34 has been wound upon it. The locking member is preferably a squared plate having spaced, parallel flanges 38 and 40 at opposite edges thereof which may be formed by simply bending two opposed edges of the locking member 36. The locking member has a central squared opening 42 which is complementary to the shape of the tensioning member 26 so as to fit closely with the tensioning member when the locking member is applied to it. Another flange 44 projects from the locking member 36 at one side of the opening 42. The flange 44 may be formed by lancing the locking member 36 so as to form the opening 42 and at the same time bend out the flange 44 to the position shown, for example, in FIG. 4. It will be understood that a like flange could be provided at an opposite side of the opening 42 if desired.

The locking member 36 is inserted over the tensioning member 26 so that the tensioning member is snugly received in the opening 42 in the manner shown in FIGS. 1, 2 and 5. The flange 44 and the other edges 45 of opening 42 engage the tensioning member to hold it securely in place. The flanges 38 and 40 embrace the leg 18 of the frame 14 and provided a strong locking action to prevent the tensioning member 26 from being rotated.

The tensioning member 26 has openings 46 and 48 in it which provide a means for receiving retainers such as the cotter pins 50 and 52. These pins prevent shifting of the tensioning member axially after the flexible element 34 has been tensioned. The tensioning member 26 may be rotated by means of a tool such as a wrench applied to either end thereof. It may be noted that the locking member 36 may be applied to the tensioning member without shifting the tensioning member axially. Likewise, the retainer pins 50 and 52 can be inserted without any shifting of the tensioning member. If it is desired to unlock the anchor, the pins 50 and 52 are removed, the locking member 36 is removed, and the flexible element is unwound from the tensioning member 26.

Figure 8:
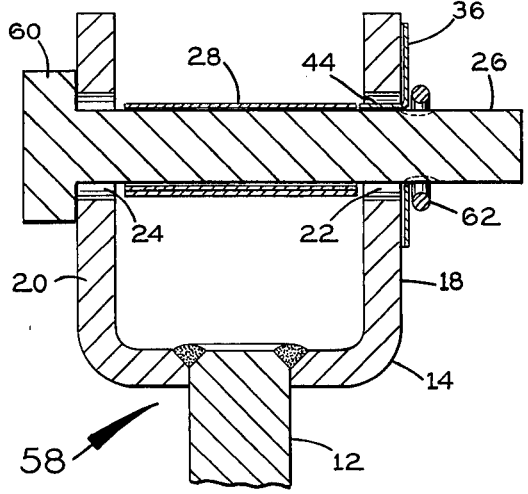
FIG. 8 is a vertical sectional view taken along line 8—8 of FIG. 7 and looking in the direction of the arrows.
Figure 7:
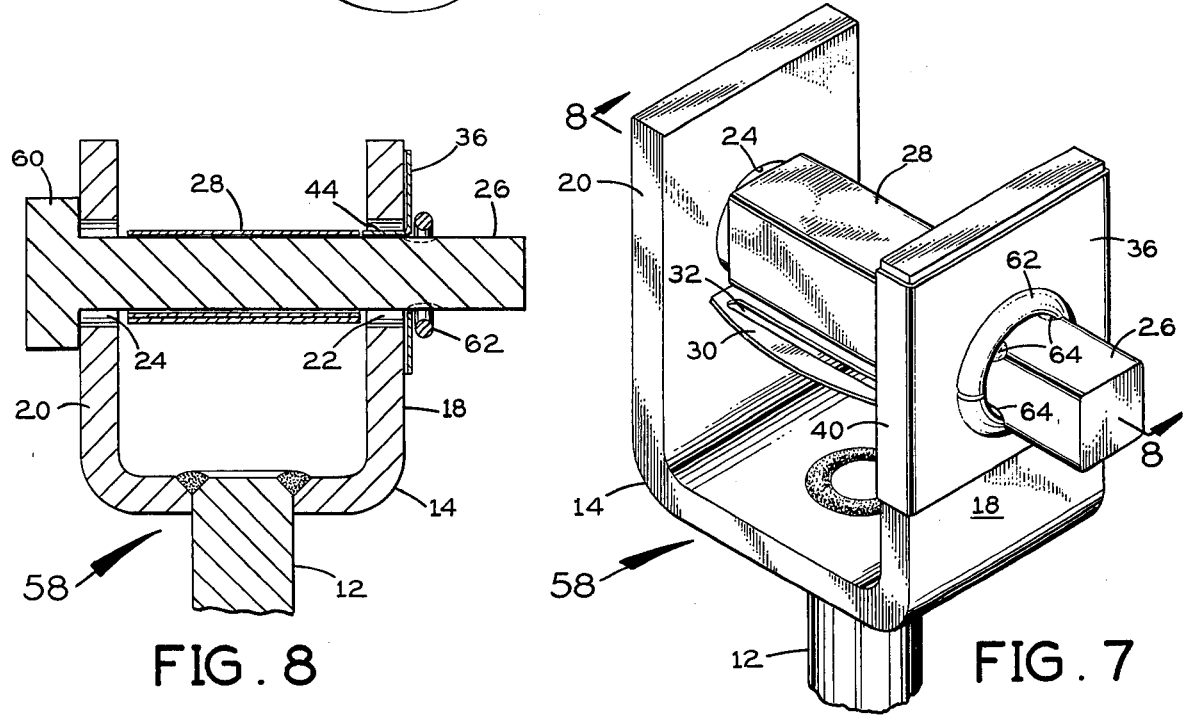
FIG. 7 is a perspective view of the device of FIG. 6 showing the device in a locked condition.

Another embodiment of the invention is shown in FIGS. 6-8 and like reference numerals are applied to like parts. Since this embodiment is very similar to the embodiment of FIGS. 1-5, only the differences will be explained. In this embodiment, the tensioning member has a hexagonal head 60 at one end thereof which replaces the pin 52. The tensioning member 26 can be rotated by applying a tool such as a wrench to the hexagonal head 60. A snap ring 62 replaces the other pin 50, and the snap ring fits in indentations 64 formed in corners of the tensioning member 26 which are equivalent to the opening 48 and act as openings.

It may be seen that in all other respects, the device 58 of FIG. 6-7 is identical to the device 10 of FIG. 1-5. In both devices, all parts are made of metal.

Having thus described my invention, I claim:

1. In a tensioning anchor for tensioning a flexible element such as a wire, strap or cable, said tensioning anchor including a frame with spaced legs having respective openings therein, and a tensioning member extending between said legs and rotatably received in said openings, said tensioning member having generally flat sides, the improvement which comprises:
    a sleeve means slidably received on said tensioning member between said legs and having aperture means formed therein for receiving the flexible element that is to be tensioned by wrapping the same around said sleeve means and said tensioning member;
    and a locking member having an opening therein with corresponding flat sides for selectively locking said tensioning member against rotation;
    said locking member having a pair of opposed, parallel flanges on opposite sides thereof for embracing one leg of said frame;
    and said locking member having a third flange at said flat sided opening therein for engaging at least one of the corresponding flat sides of said tensioning member;
    said flanges serving to lock said tensioning member.

2. A tensioning anchor according to claim 1 wherein said tensioning member has opening means formed therein at opposite ends thereof outside said legs, and retainer means received in each of said opening means for preventing axial displacement of said tensioning member.

3. A tensioning anchor as claimed in claim 2 in which said retainer means comprise pins.

4. A tensioning anchor as claimed in claim 1 in which said sleeve means comprises a strip wrapping around said tensioning member.

5. A tensioning anchor as claimed in claim 4 in which said strip has overlapping ends.

6. A tensioning anchor as claimed in claim 5 in which one of said ends has said aperture means of said sleeve means formed therein.

7. In a tensioning anchor for tensioning a flexible element such as a wire, strap or cable, said tensioning anchor including a frame with spaced legs having respective openings therein, and a tensioning member extending between said legs and rotatably received in said openings, said tensioning member having generally flat sides, the improvement which comprises:
    a sleeve means slidably received on said tensioning member between said legs for receiving the flexible element that is to be tensioned by wrapping the same around said sleeve means and said tensioning member;
    and a locking member for selectively locking said tensioning member against rotation;
    said locking member having a pair of opposed, parallel flanges on opposite sides thereof for embracing one leg of said frame;
    said locking member having means forming an opening therein with corresponding flat sides for engaging such tensioning member against rotation; and
    said locking member having a third flange at said flat sided opening therein for engaging at least one of the corresponding flat sides of said tensioning member;
    said sleeve means comprising a strip having overlapping ends, and said tensioning member and said strip having complementary non-round configurations; and
    one of said ends having aperture means formed therein for receiving the element to be tensioned.

8. The tensioning anchor as claimed in claim 7 in which said means forming said opening includes edges of said opening and a flange.

9. A tensioning anchor according to claim 1 wherein said tensioning member has indentation means formed at one end thereof outside of one of said legs, a head at the opposite end thereof outside the other of said legs, and retainer means received in said indentation means for preventing axial displacement of said tensioning member.

10. A tensioning anchor as claimed in claim 9 in which said retainer means comprises a snap action member.

* * * * *